(12) United States Patent
Lewin et al.

(10) Patent No.: US 8,166,079 B2
(45) Date of Patent: Apr. 24, 2012

(54) DYNAMIC CONTENT ASSEMBLY ON EDGE-OF-NETWORK SERVERS IN A CONTENT DELIVERY NETWORK

(75) Inventors: Daniel M. Lewin, Charlestown, MA (US); Anne E. Lewin, legal representative, Charlestown, MA (US); Andrew T. Davis, San Francisco, CA (US); Samuel D. Gendler, Alameda, CA (US); Marty Kagan, Burlingame, CA (US); Jay G. Parikh, Redwood City, CA (US); William E. Weihl, La Jolla, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 32 days.

(21) Appl. No.: 12/825,715

(22) Filed: Jun. 29, 2010

(65) Prior Publication Data
US 2010/0274819 A1 Oct. 28, 2010

Related U.S. Application Data

(63) Continuation of application No. 10/481,405, filed as application No. PCT/US01/25966 on Aug. 20, 2001, now Pat. No. 7,752,258.

(60) Provisional application No. 60/226,817, filed on Aug. 22, 2000.

(51) Int. Cl.
*G06F 17/30* (2006.01)

(52) U.S. Cl. ......... 707/803; 709/203; 709/226; 711/122

(58) Field of Classification Search .................. 707/803, 707/999.202; 709/203, 226; 711/122
See application file for complete search history.

(56) References Cited

U.S. PATENT DOCUMENTS

| | | | |
|---|---|---|---|
| 6,026,413 A * | 2/2000 | Challenger et al. | 717/108 |
| 6,249,844 B1 * | 6/2001 | Schloss et al. | 711/122 |
| 6,314,451 B1 * | 11/2001 | Landsman et al. | 709/203 |
| 6,799,214 B1 * | 9/2004 | Li | 709/226 |
| 2005/0210412 A1 * | 9/2005 | Matthews et al. | 715/835 |

\* cited by examiner

*Primary Examiner* — John R. Cottingham
*Assistant Examiner* — Noosha Arjomandi
(74) *Attorney, Agent, or Firm* — David H. Judson

(57) ABSTRACT

The disclosed technique enables a content provider to dynamically assemble content at the edge of the Internet, preferably on content delivery network (CDN) edge servers. Preferably, the content provider leverages an "edge side include" (ESI) markup language that is used to define Web page fragments for dynamic assembly at the edge. Dynamic assembly improves site performance by catching the objects that comprise dynamically generated pages at the edge of the Internet, close to the end user. The content provider designs and develops the business logic to form and assemble the pages, for example, by using the ESI language within its development environment. Instead of being assembled by an application/web server in a centralized data center, the application/web server sends a page template and content fragments to a CDN edge server where the page is assembled. Each content fragment can have its own cacheability profile to manage the "freshness" of the content. Once a user requests a page (template), the edge server examines its cache for the included fragments and assembles the page on-the-fly.

10 Claims, 9 Drawing Sheets

```
<html>
<body>
<!---personalized greeting (1)-->
Hello $(HTTP_COOKIE{"username"}

<!---targeted ad (2)-->
<esi:choose>
<esi:when test="$(GEO{country_code})='US' ">
        <esi:include src=us_ad.html/>
</esi:when>
<esi:when test="$(GEO{country_code})='Canada' ">
        <esi:include src=canada_ad.html/>
</esi:when>
<esi:otherwise>
        <esi:include src=generic_ad.html/>
</esi:otherwise>
</esi:choose>

<!---Static navigation bar (3)-->
<a href=...> <a href=...> <a href=...> <a href=...>

<!---Personalized recommendations (4)-->
<esi:include src=recommendations. html/>

<!---Static links, copyright,etc (5)-->
<a href=...> <a href=...> <a href=...> <a href=...>
Copyright 2001, etc.
</body>
</html>
```

*FIG. 6*

```
<esi:include src="products/A.html"/>
<esi:include src="products/B.html"/>
<esi:include src="products/C.html"/>
<esi:include src="products/D.html"/>
```

DYNAMIC CONTENT ASSEMBLY ON EDGE-OF-NETWORK SERVERS IN A CONTENT DELIVERY NETWORK

This application is a continuation of Ser. No. 10/481,405, filed Jan. 12, 2007, now U.S. Pat. No. 7,752,258, which application was a national phase filing of PCT/US2001/25966, filed Aug. 20, 2001, which application was based on and claimed priority to Ser. No. 60/226,817, filed Aug. 22, 2000.

BACKGROUND OF THE INVENTION

1. Technical Field

The present invention relates generally to content delivery over the Internet and, more specifically, to a dynamic content assembly mechanism that enable a content provider to cache, distribute and assemble individual content fragments on the edge of the Internet.

2. Description of the Related Art

Several years ago, the Web was seen by many companies mainly as a new way to publish corporate information. As these companies' Web sites grew, the problem of managing an increasing amount of dynamic content on these sites grew exponentially, and the first content management applications emerged. Application servers were also developed to handle all application operations between Web servers and a company's back-end business applications, legacy systems and databases. Because these applications could not process HTTP requests and generate HTML, the application server worked as a translator, allowing, for example, a customer with a browser to search an online retailer's database for pricing information. Application servers and content management systems now occupy a large chunk of computing territory (often referred to as middleware) between database servers and the end users. This is illustrated in FIG. 1. There are many reasons for having an intermediate layer in this connection—among other things, a desire to decrease the size and complexity of client programs, the need to cache and control the data flow for better performance, and a requirement to provide security for both data and user traffic. Also, an application server bridges the gap between network protocols (HTTP, FTP, etc.) and legacy systems, and it pulls together separate data/content sets, presenting them atomically to the end user.

Businesses that rely on the Internet to streamline their operations face the challenge of providing increased access to their back-end systems, preferably through Web-based applications that are accessible by customers, suppliers and partners. The business processes that must come together to drive this new generation of online applications, however, are more complex than ever before. Far from the HTML and static pages of years past, the new breed of applications depends on hundreds, if not thousands of data sources. The content involved now feeds dynamic, personalized Web-based applications.

Delivering personalized content, however, is not new. Many Web destinations, mainly portal sites, use personalization to create a unique user experience. The look and feel and content of such a site are determined by an individual's preferences, geographic location, gender, and the like. By nature, these sites rely heavily on application servers and/or content management systems and the use of well-known techniques (such as cookies) to create this dynamic and personalized user experience. The majority of pages on these sites, however, are considered non-cacheable and, as a consequence, content distribution of such pages from the edge of the Internet has not been practical.

Consider the example of an online retailer for electronic products. When a user accesses the site and searches for, say, Handhelds, that request is sent to the application server. The application server performs a database query and assembles the page based on the return values and other common page components, such as navigation menu, logos and advertisement. The user then receives the assembled page containing product images, product descriptions, and advertising. This is illustrated in FIG. 2. The next time the user (or another user) access that page, the same steps need to happen, which introduces unnecessary latency in delivery of the content to the end user. On occasion, the page might be cached within the application server's internal cache, in which case the request would still have to be satisfied from the origin server, requiring a full round-trip from browser to origin server and back and requiring additional computational processes on the application server, necessitating more CPU and memory usage.

It would be highly desirable to be able to cache the dynamic page closer to requesting end users. As is well known, content delivery networks (CDNs) have the capability of caching frequently requested content closer to end users in servers located near the "edge" of the Internet. CDNs provide users with fast and reliable delivery of Web content, streaming media, and software applications across the Internet. Users requesting popular Web content may well have those requests served from a location much closer to them (e.g., a CDN content server located in a local network provider's data center), rather than from much farther away at the original Web server. By serving content requests from a server much closer electronically to the user, a quality CDN can reduce the likelihood of overloaded Web servers and Internet delays.

Returning back to the example, assume that the content provider assigned the dynamic page a Time To Live (TTL) of one (1) day, for example, because there are only infrequent changes to the inventory for Handhelds. The first time a user requests the page it is assembled by the application server as described in FIG. 2. Because the page has a TTL of one day, it would be highly desirable to be able to store the page on the CDN edge servers for that time period, so that all subsequent requests for that page could be served from a server closer to other requesting end users who might want similar information. This is illustrated in FIG. 3. This cached version preferably would include those product images and description that are common components and generally do not vary from user to user. Even though the page was originally assembled for an individual user, it would be desirable to be able to cache given fragments themselves so that the building blocks of the page can be shared between users.

The dynamic content assembly mechanism described herein provides this functionality.

BRIEF SUMMARY

The disclosed technique provides the ability to dynamically assemble content at the edge of the Internet, e.g., on CDN edge servers. To provide this capability, preferably the content provider leverages a server side scripting language (or other server-based functionality) to define Web page fragments for dynamic assembly at the edge. Dynamic assembly can improve site performance by caching the objects that comprise dynamically generated HTML pages at the edge of the Internet, close to the end user. The content provider designs and develops the business logic to form and assemble the pages, preferably using an "edge side include" (ESI) language within its development environment. This business logic is then interpreted by the edge servers to produce a response for the end user.

Instead of being assembled by an application/web server in a centralized data center, the application/web server sends a page container (or "template") and content fragments to a CDN edge server where the page is assembled. A "content fragment" typically is some atomic piece of content in a larger piece of content (e.g., the container) and that, preferably, has its own cacheability and refresh properties. Once a user requests a page, the edge server examines its cache for the included fragments and assembles the page markup (e.g., HTML) on-the-fly. If a fragment has expired or is not stored on the edge server, the server contacts the origin server or another edge server, preferably via an optimized connection, to retrieve the new/missing fragment. The two main benefits of this process are faster loading pages, because pages are assembled closer to the end user, instead of on the origin server, and reduced traffic/load on the application/web server, because more requests can be satisfied on the network edge and smaller pieces of content are being transmitted between the origin server and edge server. The present invention thus allows the content provider to separate content generation and/or management, which may take place in a centralized location, from content assembly and delivery, which can take place at the edge of the Internet.

More generally, the dynamic content assembly mechanism as described herein provides the base layer of a pluggable architecture from which one or more processing engines (e.g., text such as HTML, XSLT, Java, PHP, and the like) may be instantiated and used to process a container and its content fragments. Thus, for example, a given request received at the edge server is mapped to a given base processor, preferably by content provider-specific metadata, and one or more additional processors may then be instantiated to enable content fragments to be assembled into the container to create an assembled response that is then sent back to the requesting end user.

The foregoing has outlined some of the pertinent features and advantages of the present invention. A more complete understanding of the invention is provided in the following Detailed Description of the Preferred Embodiment

BRIEF DESCRIPTION OF THE DRAWINGS

FIG. 6 is representative ESI markup for the page shown in FIG. 5;

FIG. 7 is representative HTML returned from the origin server as a result of the edge server tunneling a request for non-cacheable content;

DETAILED DESCRIPTION OF THE PREFERRED EMBODIMENT

Figure 1:
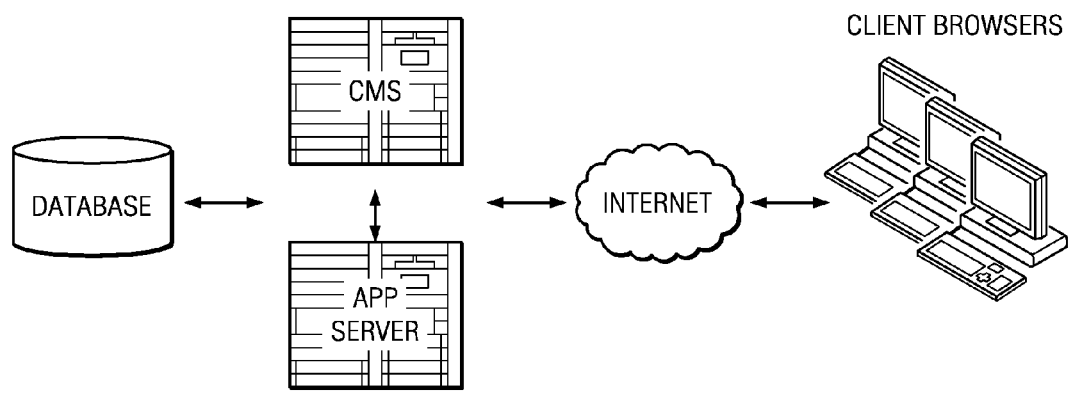
FIG. 1 illustrates a conventional e-business Web site having an application server and a content management system to assemble and deliver personalized content from a centralized location.

The dynamic content assembly mechanism of this disclosure leverages any server side scripting language or other server-based functionality. In a preferred embodiment, the functionality is a variant of server side include processing that is sometimes referred to as an "edge side include" to emphasize that the processing is carried out on an edge server. Traditionally, "server side include" languages use directives that are placed in HTML pages and that are evaluated on a server before the page is served. They provide a way to enable the server to add dynamically-generated content to an existing HTML page.

According to this disclosure, ESI is a simple markup language used to define the business logic for how Web page components are dynamically assembled and delivered from the edge of the Internet. More specifically, ESI provides a way for a content provider to express the business logic of how an ICDN should be assembling the content provider's pages. Thus, ESI is a common language that the content provider can use and the CDN service provider can process for content assembly, creation, management and modification. ESI provides a mechanism for assembling dynamic content transparently across application server solutions, content management systems and content delivery networks. It enables a content provider to develop a Web application once and choose at deployment time where the application should be assembled, e.g., on a content management system, an application server, or the CDN, thus reducing complexity, development time and deployment costs. ESI is described in detail at http://www.edge-delivery.org/spec.html. ESI provides the content provider/developer with the following capabilities:

Inclusion—a central ESI feature is the ability to fetch and include files that comprise a web page, with each file preferably subject to its own configuration and control, namely, cacheability properties, refresh properties, and so forth. An <esi:include> tag or similar construct may be used for this purpose. An include statement can have a time-to-live (TTL) attribute that specifies a time-to-live in cache for the included fragment.

Environmental variables-ESI supports use of a subset of standard CGI environment variables such as cookie information. These variables can be used inside ESI statements or outside ESI blocks. An <esi:vars> tag or similar construct may be used for this purpose.

Conditional inclusion—ESI supports conditional processing based on Boolean comparisons or environmental variables. An <esi:choose> tag or similar construct may be used for this purpose.

Exception and error handling—ESI allows specification of alternative pages and for default behavior in the event that an origin site or document is not available. An <esi:try> tag or similar construct may be used to specify such alternative processing, e.g., when a request fails. Further, it provides an explicit exception-handling statement set.

ESI provides a number of features that make it easy to build highly dynamic Web pages: coexistence of cacheable and non-cacheable content on the same page, separation of page assembly logic and delivery (so that complex logic required to select the content itself is separated from the delivery of that content), the ability to perform ESI processing recursively on components themselves, and the ability to perform logic (e.g., certain personalization and conditional processing) on an edge server. The ESI language recognizes the fact that many pages have dynamic and often non-cacheable content. By breaking up Web pages into individual components, each with different cache policies, ESI makes it easy to speed up the delivery of dynamic pages. Only those components that are non-cacheable or need updating are requested from the origin server. This functionality results in a considerable speed improvement over prior art centralized assembly and delivery of dynamic content.

Recursive ESI logic may be used to separate page logic from content delivery. Any ESI fragment can, in turn, contain other fragments, etc. In particular, a non-cacheable dynamic fragment can contain include functionality, e.g., an <esi:includes> tag set, to point to cacheable sub-fragments. Personalization is provided, e.g., using an <esi:choose> tag, that allows content providers to include different content fragments based on: user-agent and other header values, cookie values, a user's location, a user's connection speed, and the like. Finally, many different variables (e.g., cookie-based variables, query-string, accept_language, etc.) can be substituted into the text of the page, which makes many previously non-cacheable personalized pages easily deliverable from the edge. These variables can also be used to evaluate conditional logic.

Figure 4:
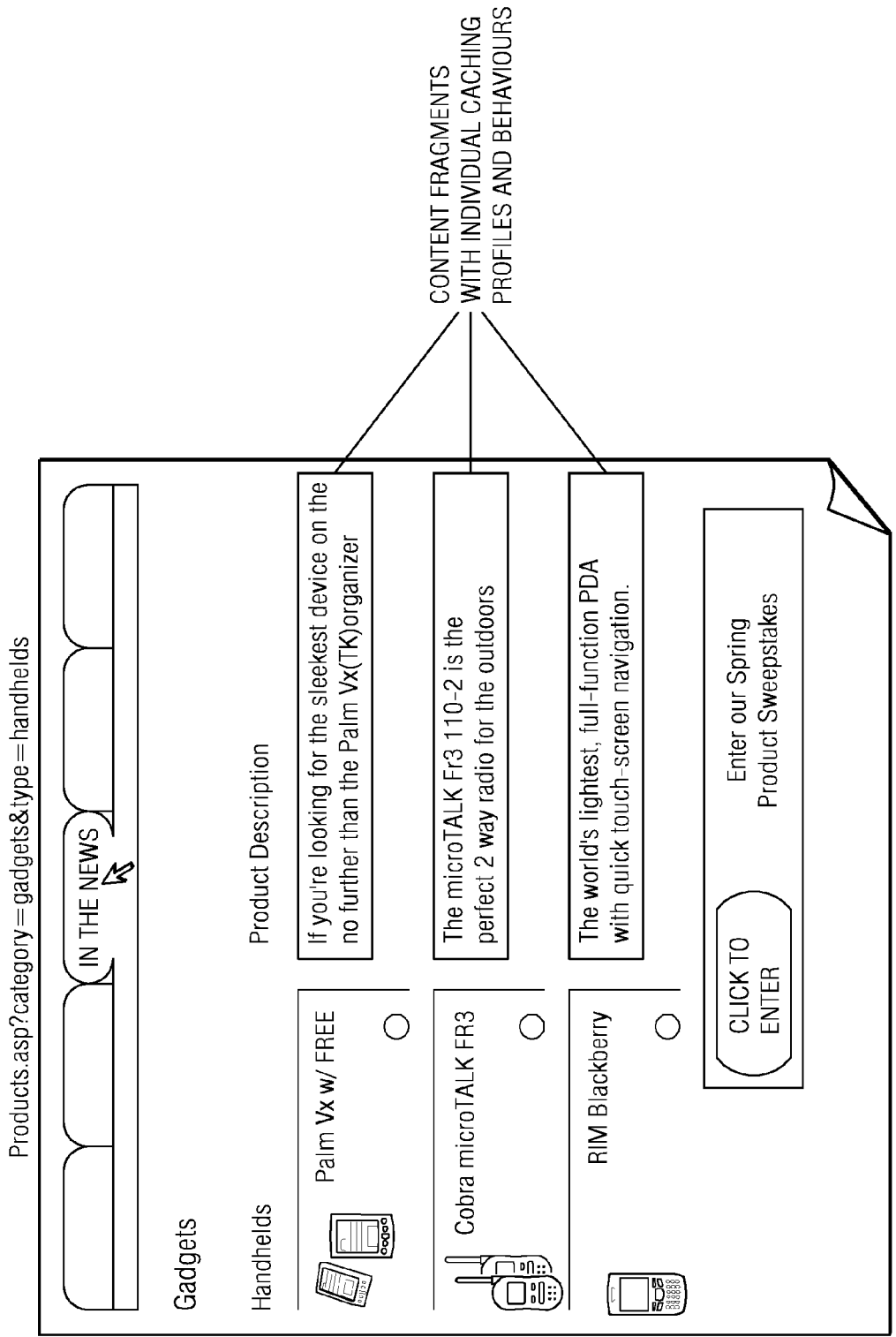
FIG. 4 illustrates a representative "container" page having individual content fragments that may be assigned individual caching profiles and behaviors according to this disclosure.

FIG. 4 illustrates the representative "Handhelds" container page described earlier having individual content fragments that are assigned individual caching profiles and behaviors according to the present invention. In particular, each fragment is treated as its own separate object with its own cache entry and corresponding HTTP headers. Generalizing, a content fragment is a logical sub-piece of a larger piece of content. As will be described below, preferably a content provider can defines rules for how an object is served. These rules are provided in the form of object "metadata," and preferably there is a metadata file per content provider customer. Metadata may be provided in many ways, e.g., via HTTP response headers, in a configuration file, or a request itself. The rules for the object thus are derived from the metadata for that customer.

According to this disclosure, a given content fragment may have its own cacheability and other properties set by way of headers or configuration files, or in some other manner. Thus, a given container may be cached for several days, while a particular fragment that contains a story or advertisement may only be cached for minutes or hours. Particular fragments may be set so they are not cached at all. The container page may be made non-cacheable, which allows for user-specific data to come back to the container page and then be included/acted-upon in some include(s) that are called from the container page. According to the disclosure, cached templates and fragments may be shared among multiple users. Thus, for a large number of requests, preferably the entire page (or most of it) can be assembled using shared components and delivered from a given server close to requesting end users.

Figure 5:
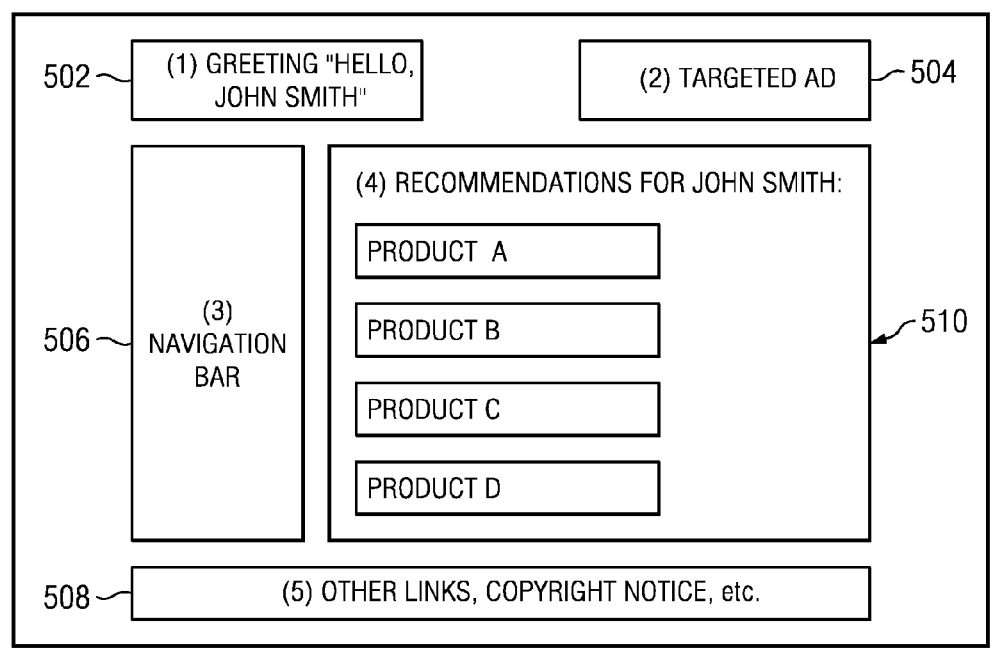
FIG. 5 illustrates a dynamic page that is assembled by the disclosed dynamic content assembly mechanism.
Figure 2:
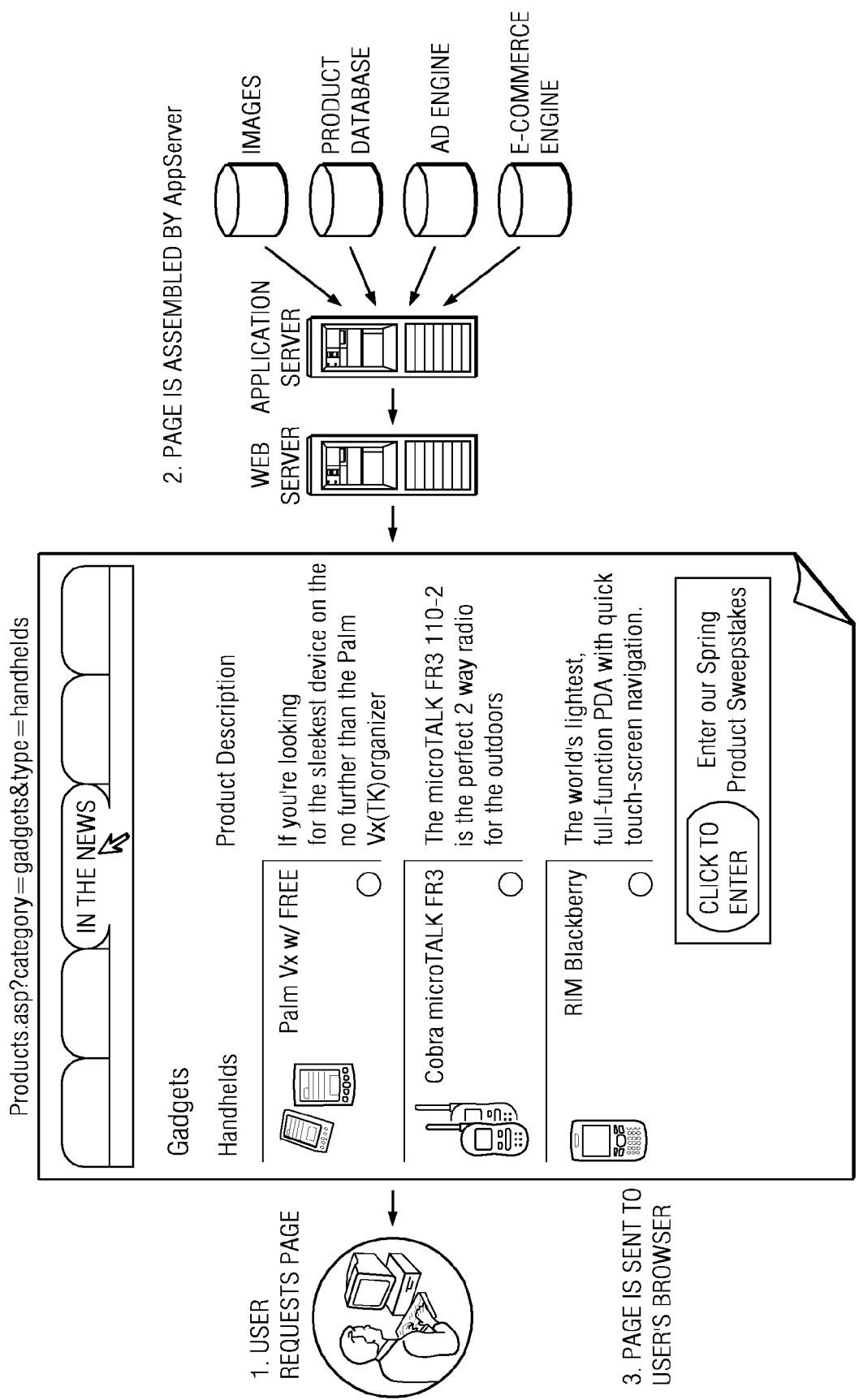
FIG. 2 illustrates how the application server in the Web site of FIG. 1 generates a dynamic page in response to an end user request.
Figure 3:
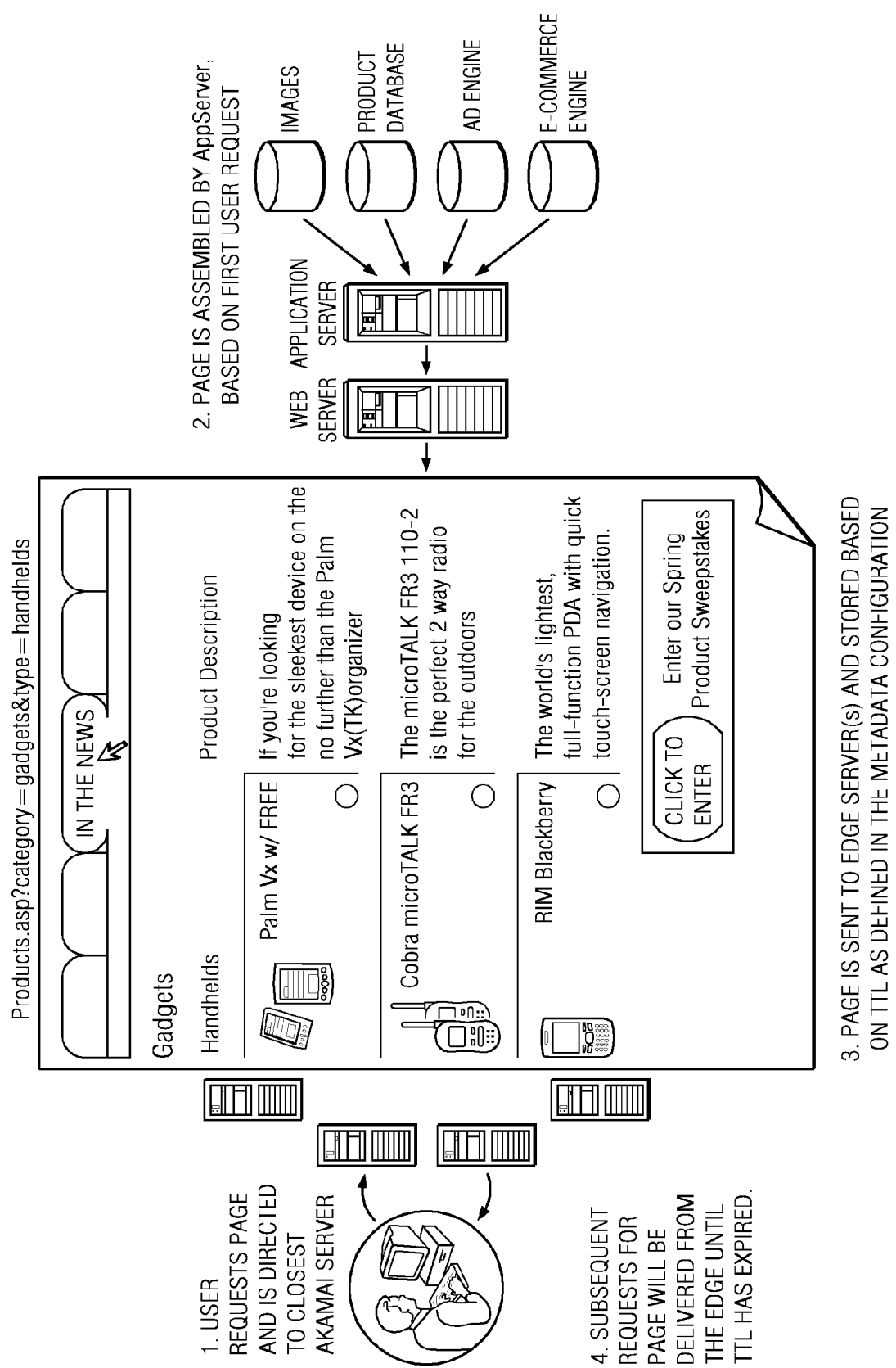
FIG. 3 illustrates how a dynamic page may be cached on a content delivery network (CDN) edge server according to a technical advantage of this disclosure.

More generally, FIG. 5 illustrates a container page 500 from an e-commerce Web site that contains:

a personalized greeting 502 generated by a personalization engine;

a targeted advertisement 504 generated by an ad serving technology;

a navigation bar 506 and a footer 508 generated by a content management system; and product recommendations 510, such as generated by a customer relationship management (CRM) application.

As can be seen, the navigation bars, links and copyright notice (elements 506, 508) are static content, the personalized greeting 502 is unique for the customer, the targeted ad 504 depends on the user's location (e.g., the user's IP address), and the user recommendations 510 are made on the basis of complex analysis by the site's collaborative filtering engine. Thus, most of the content on this page is personalized and dynamically generated. Nevertheless, the page can be successfully delivered from an edge server using ESI. FIG. 6 illustrates a representative ESI version of the page. In this example, the representative ESI markup facilitates the coexistence of cacheable and uncacheable content on the same page. In particular, blocks (3 and 5) are static, and blocks (1, 2 and 4) are dynamic. The static blocks make up the template, and dynamic blocks are included using various ESI commands. In addition, the ESI markup enables page logic and delivery separation. In particular, consider the block (4) recommendations. This block is uncacheable and, as a consequence, the request for this content is tunneled back to the origin server. What is returned, however, is preferably not the full HTML block, but rather a list of references to the recommended products, as shown in FIG. 7. In this example, it should be noted that each of the product descriptions is cacheable, and preferably the total number of products recommended to all the users can be easily cached on the edge. The logic to generate the recommendations fragment preferably resides at the origin server, but the actual HTML is cached and delivered from the edge server. Also, because requests for non-cacheable fragments like recommendations html preferably are tunneled to the origin server (e.g., over a persistent connection), they can be used to update session state information. Therefore, user recommendations may be caused to depend on previous pages visited.

Returning back to the example in FIG. 6, fragments (1) and (2) illustrate how business logic is incorporated on a page. In fragment (1), the value of cookie "username" is substituted into the body of the page to produce a personalized greeting. Fragment (2) illustrates personalization and an ESI conditional for which advertisement to include, which is dependent on the user's geographic location. If the user is from the USA, the us_ad.html fragment is included. If the user is from Canada, then canada_ad.html is included. Otherwise, a generic ad is shown. The CDN can provide information about user's location available to the content providers. Of course, us_ad.html, canada_ad.html, and generic_ad.html all can be cached on the network.

Thus, even though most of this example Web page is generated dynamically, the majority of the fragments making up the page are cached and delivered from the edge. The amount of data that has to be retrieved from the origin site is very small. This operation results in a significant performance improvement for the end user and a reduction of infrastructure required to deliver the site.

The dynamic content assembly mechanism is now described in more detail. As will be seen, this mechanism generally is implemented as software, i.e., as a set of program instructions, in commodity hardware running a given operating system. In one embodiment, the dynamic content assembly (DCA) mechanism is implemented in an Internet content delivery network (ICDN). Typically, a conventional CDN is implemented as a combination of a content delivery infrastructure, a request-routing mechanism, and a distribution infrastructure. The content delivery infrastructure usually is comprised of a set of "surrogate" origin servers that are located at strategic locations (e.g., Internet network access points, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. A CDN service provider (CDNSP) may organize sets of surrogate origin servers as a "region." In this type of arrangement, an ICDN region typically comprises a set of one or more content servers that share a common backend, e.g., a LAN, and that are located at or near an Internet access point. Thus, for example, a typical ICDN region may be collocated within an Internet Service Provider (ISP) Point of Presence (PoP). A representative ICDN content server is a Pentium-based caching appliance running an operating system (e.g., Linux, Windows NT, Windows 2000) and having suitable RAM and disk storage for ICDN applications and content delivery network content (e.g., HTTP content, streaming media and applications). Such content servers are sometimes referred to herein as "edge" servers as they are located at or near the so-called outer reach or "edges" of the Internet. The ICDN typically also includes network agents that monitor the network as well as the server loads. These network agents are typically collocated at third party data centers and may exist reside in the CDN content servers. Map maker software receives data generated from the network agents and periodically creates maps that dynamically associate IP addresses (e.g., the IP addresses of client-side local name servers) with the ICDN regions. In one type of service offering, available from Akamai Technologies, Inc. of Cambridge, Mass., requests for content that has been tagged for delivery from the ICDN are directed to the "best" region and to an edge server within the region that is not overloaded and that is likely to host the requested content. Thus, the mapping of end users requests to edge servers is done via DNS that is dynamically updated based on the maps. While an ICDN of this type is a preferred environment, the dynamic content assembly mechanism may be incorporated into any network, machine, server, platform or content delivery architecture or framework (whether global, local, public or private).

Figure 8:
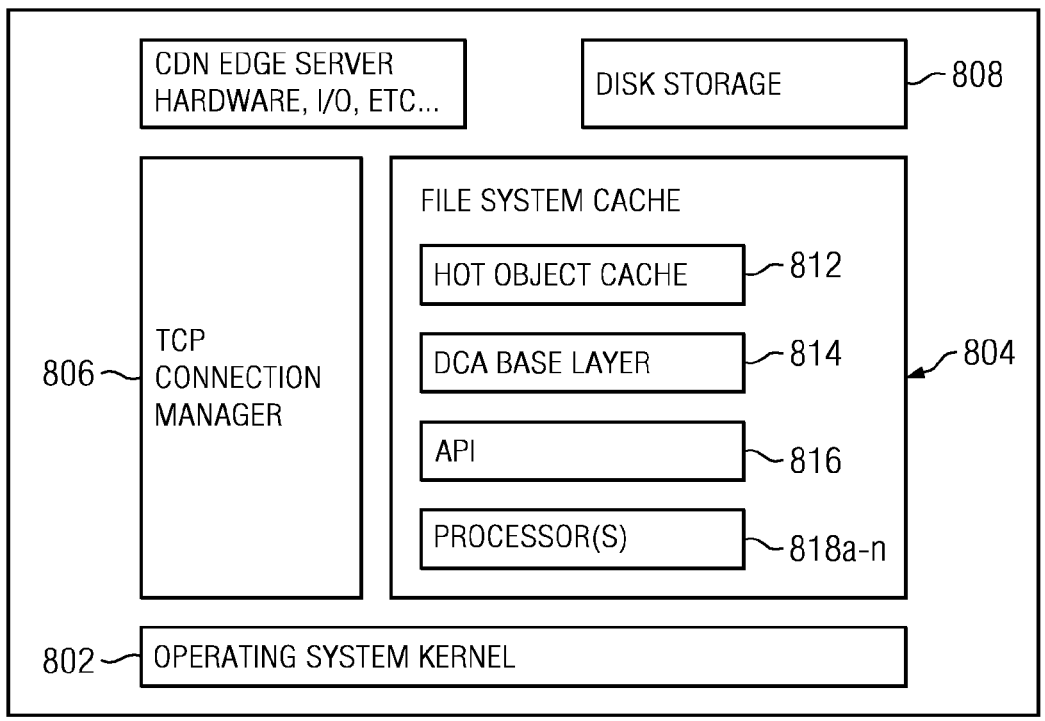
FIG. 8 is a representative edge server that may be used to implement the dynamic content assembly mechanism.

FIG. 8 illustrates a typical machine configuration for a CDN content edge server on which the inventive DCA mechanism is implemented. Typically, the content server 800 is a caching appliance running an operating system kernel 802, a file system cache 804, TCP connection manager 806, and disk storage 808. File system cache 804 and TCP connection manager 806 comprise CDN global host (sometimes referred to as "GHost") software 808, which, among other things, is used to create and manage a "hot" object cache 812 for popular objects being served by the CDN. In operation, the content server 800 receives end user requests for content, determines whether the requested object is present in the hot object cache or the disk storage, serves the requested object via HTTP (if it is present) or establishes a connection to another edge server or an origin server to attempt to retrieve the requested object upon a cache miss.

For purposes of illustration only, GHost software 808 includes a dynamic content assembly base layer 814, and an application programming interface 816 that enables the base layer to instantiate and use one or more of a set of processors 818a-n. Generalizing, a "processor" is any mechanism that algorithmically processes a formal language to generate output that differs from the input. Each processor is designed to process a given type of content, and a given container may include "mixed" content, namely, content fragments of varying type. An example would be an HTML page that uses an <esi:include> tag for a fragment that needs to be first processed by XSLT, as more particularly described below. Thus, in the pluggable architecture illustrated in FIG. 8, a given processor 818 may be a so-called "ESI" processor for parsing text (such as HTML), an XML-based processor (e.g., Apache Xalan, Mozilla TransforMiix, IBM WebSphere XML4J, or the like) for parsing XML and XSL, a Java-based processor including a Java Virtual Machine (JVM) for processing servlets, .jsp files, and other J2EE web applications, a PHP processor for processing PHP, which is a known server-side, cross-platform, HTML embedded scripting language, a processor for processing content (e.g., ASP.NET pages) written to conform to Microsoft's .NET initiative, a processor dedicated to processing a given binary file, a processor dedicated to converting a given file format to another file format, a processor dedicated to modifying given content in some predetermined manner, and other processor(s) as desired to parse/process content written to conform to other native execution environment(s) and that can leverage an underlying server side scripting language (such as ESI) or other server side functionality.

A particular advantage of the present invention is the ability to handle multiple types of content using an integrated pluggable architecture having an underlying dynamic content assembly mechanism. Multiple processors (for processing different content types) can be instantiated to handle a specific request for a given container page, as will be seen. In particular, preferably a given content request received at the edge server is mapped, e.g., by content provider-specific metadata, to instantiate a given base processor, and one or more additional processors may then be instantiated as necessary to assemble given content fragments into the container to produce an assembled document that is then returned to the requesting end user. Multiple processors may also be daisy-chained together to sequentially process a request (e.g., ESI to XSLT to WML).

Figure 9:
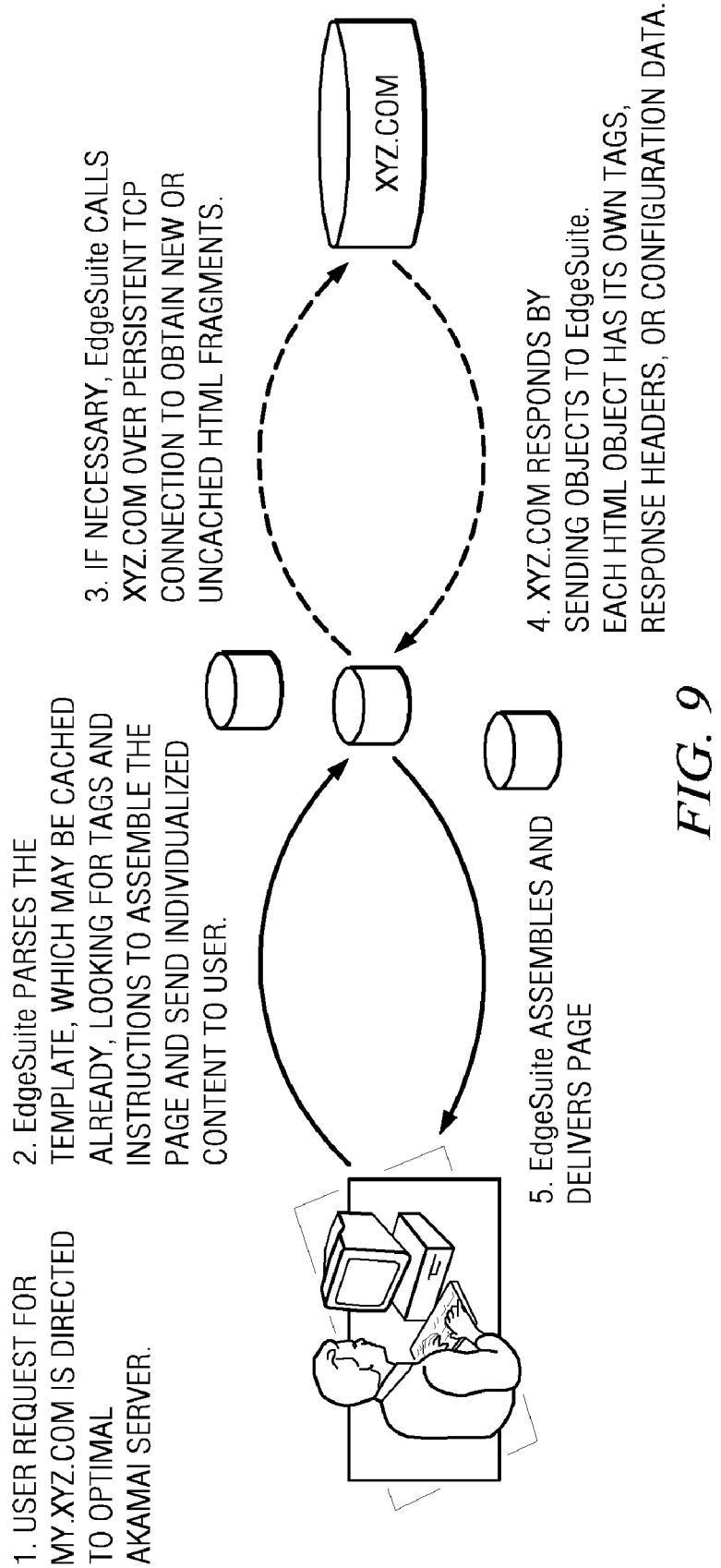
FIG. 9 is a flowchart of HTML container page assembly.

FIG. 9 is a flowchart illustrating the dynamic content assembly process of the present invention for an HTML page. In step (1), an end user enters a URL into his or her browser, e.g., http://www.cp.com/index.html. The browser makes a DNS request to resolve www.cp.com and gets sent back an IP address for a given "edge" server in the ICDN. This process is described generally in U.S. Pat. No. 7,596,619, the disclosure of which is incorporated herein by reference. The browser requests the HTML document (e.g., my.xyz.com) from the identified server. If the HTML document (a "container") is not already cached on the server, the server requests the document from the origin server (namely, the content provider). (Or, if the document is cached but need to be refreshed, the edge server sends an If-Modified-Since HTTP request to the origin server or other GHost machine that is known to have the content). The content provider origin server delivers the HTML page to the CDN edge server if necessary (not shown). At step (2), the edge server parses the HTML page looking for tags that specify dynamic assembly instructions including, without limitation, URLs for HTML chunks to be incorporated in the final HTML page. The DCA tags are preferably specified according to ESI, or some other server side scripting language, as has been described generally above.

Returning to FIG. 9, if the additional HTML chunks are not already cached on the edge server, the server requests the document(s) from the origin server. (Likewise, if the chunks are cached but need to be refreshed, the edge server sends If-Modified-Since HTTP request(s) to the origin server or another edge server). This is step (3). At step (4), the origin server delivers the HTML chunk(s) to the edge server. At step (5), the edge server assembles the final HTML page from the container page and HTML chunks/fragments. The final HTML page is then sent to the requesting end user. The HTML page may contain URLs or other CDN-modified resource locators to other embedded page objects such as .gif, .jpg, or the media-rich content, which is then requested from the CDN. The CDN delivers this content to complete the HTML page delivery process. Even though the page is being dynamically assembled, it may be useful to cache the generated result for some period of time. Thus, for example, if a finance page is assembled from fragments that include the current values of the DJIA, NASDAQ, etc., the page can be cached for a given time, e.g., 30 seconds or even a few minutes. Therefore, if the page gets hit again during that time, it does not need to be reassembled.

Figure 10:
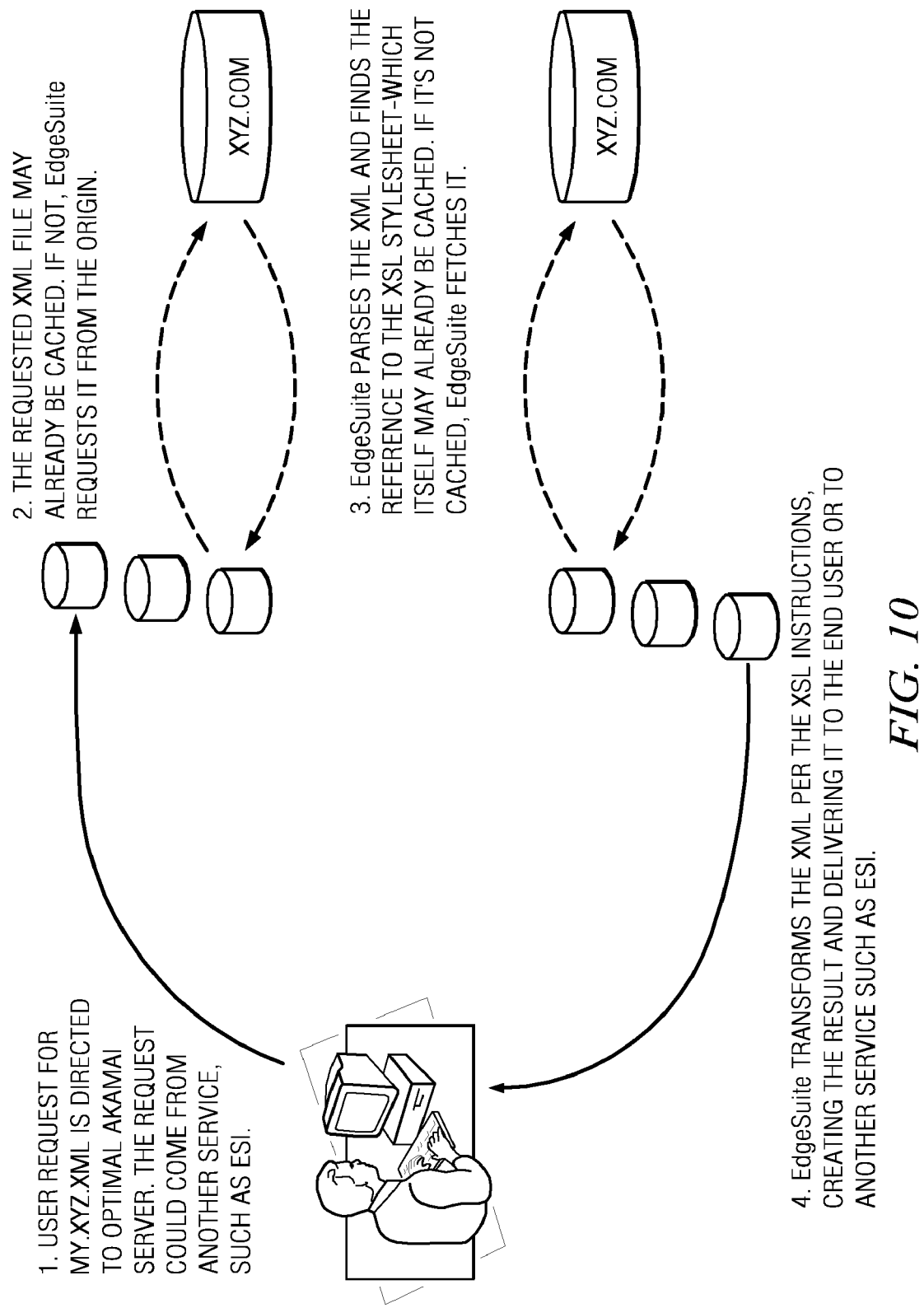
FIG. 10 is a flowchart of XML container page assembly.

FIG. 10 illustrates the dynamic content assembly process for an XML container that requires an XSL transformation after the edge server has been selected. At step (1), the end user request for the XML container (e.g., /my.xyz.xml) is directed to the optimal server for the user. The XML object associated with the request may already be cached at the edge server. If the XML source is not cached, it is fetched from the origin server and then cached. This is step (2). The edge server then parses through the XML page. The XML page typically includes an XSL style sheet. At step (3), the server checks to see if the XSL style sheet is already cached. If not, the server fetches the XSL object from its referenced location and, if appropriate, caches it. At step (4), the server transforms the XML per the instructions in the XSL, creating a page that the server then delivers to the end user. An example of this page is set forth below:
TABLE-US-00001 <?xml version="1.0"?><?xml-style sheet type="text/xsl" href="identity.xsl"?><!--this is a test document--><document><!--test comment--><x name="x">x</x><y name="y">y</y><z name="z">z</z></document>.

The above example points out an important advantage. In particular, XSLT allows the content provider to separate data from presentation logic very effectively. In XSLT, the XML file is often the data that is user-specific or uncacheable, and the XSL style sheet is the presentation logic for how to process the data (which is XML) and generate some output. Edge-based assembly according to this disclosure allows the content provider to do the "presenting" at the edge, while still maintaining control over the data and defining the presentation logic that the edge server interprets.

Figure 11:
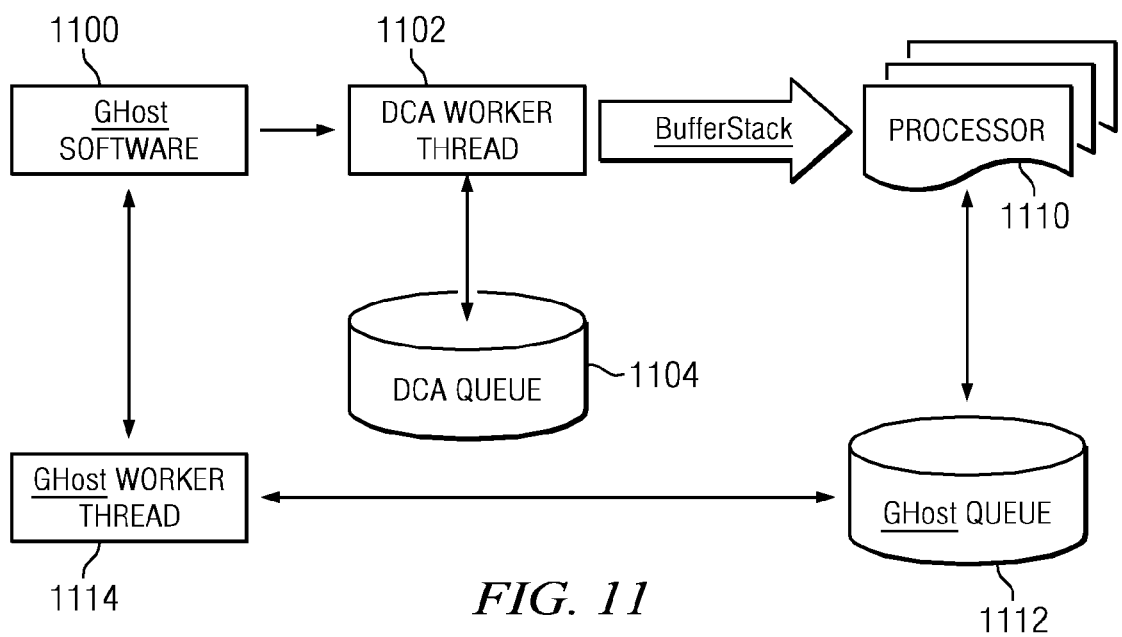
FIG. 11 illustrates how the dynamic content assembly mechanism instantiates an associated processor to carry out an edge-based dynamic content assembly function.

The dynamic content assembly processes illustrated above are implemented by a dynamic content assembly (DCA) mechanism in cooperation with GHost operative in an edge server. FIG. 11 illustrates the basic processing. When the GHost software 1100 initializes, it starts a DCA worker thread 1102, which then loops, looking for work that may be performed by the mechanism. As described above, it is assumed that GHost receives requests for page resources, typically DCA container documents (e.g., index.html, index.xml, index.jsp, etc.) that may contain ESI-based or other server side scripting markup. (XML and JSP pages typically may not have ESI tags in them but still may use other "include" functionality that permits combining fragments and containers). Although not part of this disclosure, the GHost software preferably includes the ability to process a given request according to content provider-specified "metadata" that may be provided to GHost in the request directly, in a request header, or via an out-of-band delivery mechanism (e.g., using the CDN). Thus, a given request received by GHost preferably is processed against content provider (CP) metadata to determine how the request is to be processed by GHost. As an example, given CP metadata may simply state that any request ending with an .xml extension is processed with the XSLT processor. More generally, metadata can be used to control the choice of processor, irrespective on content type or filename extension.

The metadata processed request is placed in DCA queue 1104. The DCA queue and the DCA worker thread correspond generally to the API 816 illustrated in FIG. 8. The DCA worker thread takes the entry off the queue and parses the client request headers. The DCA worker thread then parses the response by splitting it into HTTP response headers and a request body to form a data object, sometimes called a BufferStack. Once this processing is done, the DCA worker thread instantiates the appropriate processor 1110 based on the metadata for the specific request (which may be a request for the container or some fragment in the container). Processor 1110 parses the body and creates a given representation, preferably a "parse tree" of the ESI code in the document and the surrounding body, which is typically HTML.

Generalizing, processor 1110 parses the data object by scanning the data and applying appropriate grammar rules to create a tree representation of the data. By way of brief background, it is well known that HTML is limited because style and logic components of an HTML document are hardcoded. XML provides a way for an author to create a custom markup language to suit a particular kind of document. In XML, each document is an object, and each element of the document is an object. The logical structure of the document typically is specified in a Document Type Definition (DTD). A DTD comprises a set of elements and their attributes, as well as a specification of the relationship of each element to other elements. Once an element is defined, it may then be associated with a style sheet, a script, HTML code or the like. Thus, with XML, an author may define his or her own tags and attributes to identify structural elements of a document, which may then be validated automatically. An XML document's internal data structure representation is a Document Object Model (DOM). The DOM makes it possible to address a given XML page element as a programmable object. Basically, it is basically a tree of all the nodes in an XML file. This is the tree representation described above.

Preferably the tree representation is cloned and then cached in the ghost's cache. This step is not required but provides certain performance advantages, as will be described below. The processor then processes or "walks" the tree, moving from top to bottom and left to right. Depending on the ESI markup, this processing evaluates expressions, performs variable substitution, fires include(s), and the like. If there is an include tag, the worker thread links the "include" to its parent (so that the "include" can be resolved to its parent later), forms a request for the "include," and places the request on a GHost queue 1112. Preferably, GHost includes a worker thread 1114 that continually scans the GHost work queue 1112 for work. The request is then picked up by GHost, which processes it, for example, by retrieving the object from cache (disk or memory) or, if necessary, from the origin server (or another GHost machine). Once retrieved, the fragment is placed on the DCA queue, and the process as described above basically starts over. In particular, the response headers are parsed, although the request headers do not need to be parsed again because they are the same as in the parent document. After the "include" is processed, the child process notifies the parent with data and, if appropriate, an error code.

The processor then "serializes" the results generated by processing the content directives by concatenating the results according to the tree representation. The content directives typically are asynchronous operations and, as a consequence, the results may be generated in an asynchronous manner. The serialization process may concatenate results as those results become available to optimize processing. When finally completed, the processor places the BufferStack back onto the GHost queue 1112, from where it is retrieved by GHost worker thread 1114. GHost then returns the requested page (viz., the container processed according to the dynamic content directives) to the requesting end user to complete the page delivery process. The processor used to process the request is then extinguished, and the DCA worker thread moves on processing other items in the DCA queue.

As described above, preferably the tree representation is cloned and cached in the GHost object cache. Caching the parse tree obviates the scanning and parsing operations, which may add significant latency to the overall DCA process and that are often unnecessary across multiple requests for the same object. When the tree representation is cached and is appropriate for the then-current resource request, the dynamic content assembly page directives are carried out immediately upon receipt of the parse tree.

Figure 12:
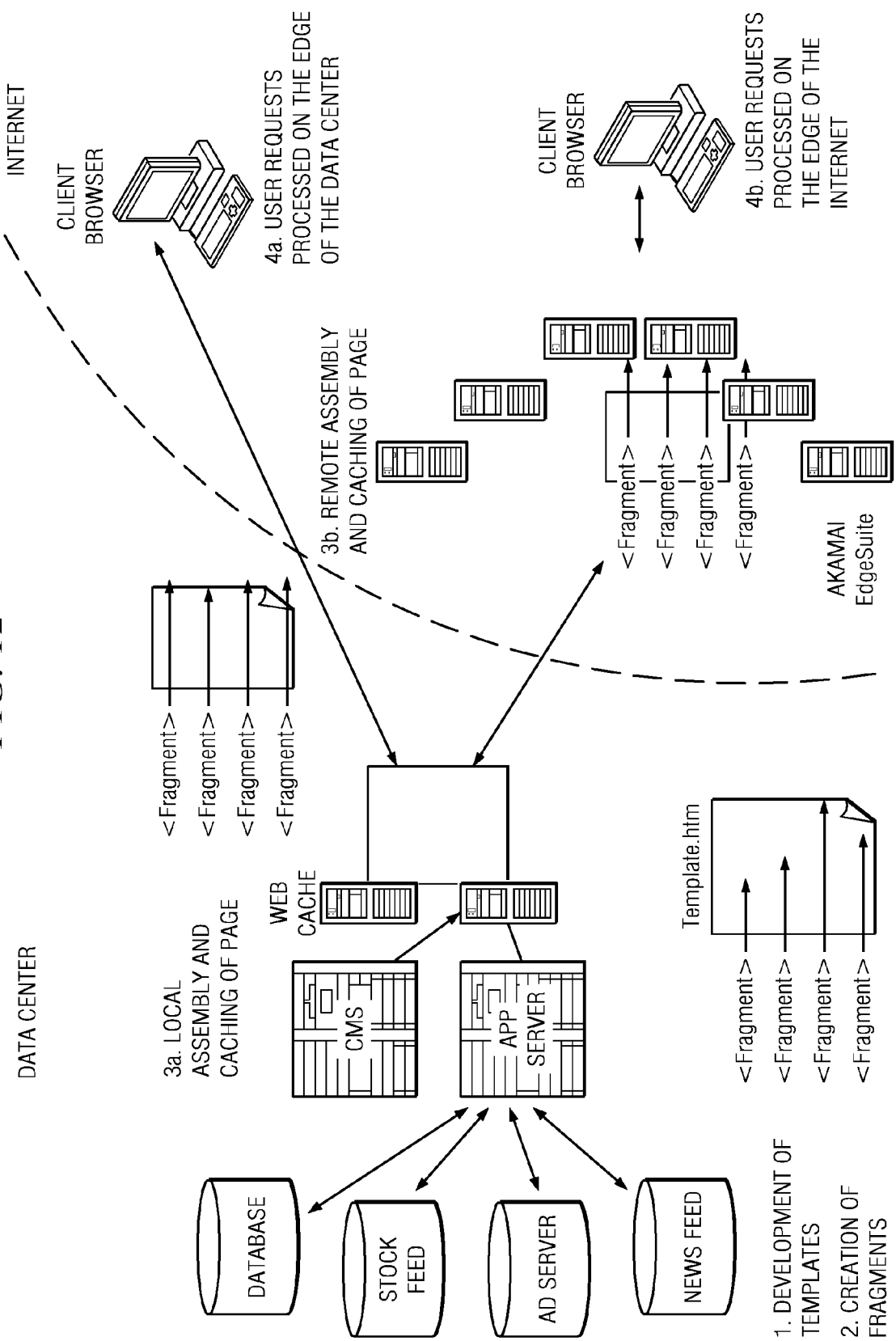
FIG. 12 illustrates how the remote assembly and caching of a page and/or its fragments enables a content provider to reduce Web site infrastructure.

The following describes how the inventive dynamic content assembly mechanism processes an HTML page having a fragment that needs to be processed by XSLT. FIG. 12 illustrates the overall architecture of a CDN having edge servers that support dynamic content assembly of a container document having content fragments. This example illustrates how the DCA mechanism provides a pluggable architecture for multiple content types that use ESI directives. Assume that the sample container page (foo.html) has the following markup and that the XML page bar.xml has an associated stylesheet:

TABLE-US-00002 ****************************** <html><body>
<esi:include src="bar.xml"/></body>
</html>******************************

Preferably, the XSLT processor processes the XML file before being included in the HTML container page, The overall processing of the container is carried out as follows. First, a request is received at CDN edge server for the foo.html container. It may be assumed that the request was directed to that server through a CDN request routing mechanism, although this is not a requirement. Because of customer metadata, GHost software in the CDN edge server is directed to process the request before responding to the end user. To this end, GHost first places the request on the DCA queue, as previously described. The DCA worker thread (which was initialized on startup of GHost) takes the entry off the DCA queue. The DCA worker thread parses the request headers (i.e., client request headers). It then parses the response by splitting it into HTTP response headers and the respective body. Once this processing is done, the worker thread, based on metadata, instantiates the appropriate processor to process the request. In this example, an ESI processor is instantiated to process foo.html. The ESI processor parses the body of the foo.html and creates a parse tree. The processor then processes the tree. As noted above, this includes evaluating expressions, performing variable substitution and, most importantly, firing includes. In this example, there is an XML include, which is then instantiated as a "child" and processed as follows.

In particular, the processor links the "include" to its parent (foo.html) so that the parent-child relationship can be maintained in subsequent processing. In a preferred embodiment, this is achieved by storing the link as a state object as part of the processor handling the request. The linking operation ensures that the "include" is a component of foo.html and not its own separate request. The request manager then forms a request for the "include" and places this request on the GHost queue. This request may take the form of a URL that is sent to GHost. Thus, to GHost, this request looks like a normal end user browser connection. As described above, the GHost software continually reads the GHost queue for work that the DCA mechanism requests. When the GHost worker thread sees the new request, it retrieves the object, bar.xml, either from cache (disk or memory) or, if necessary (because the object is not there or has expired) goes forward to the origin server (or another GHost machine) to retrieve it. Preferably, GHost tunnels back to the origin server over a persistent TCP connection to retrieve the object. A persistent connection obviates the normal three-way TCP handshake used to set up a connection. The connection may also be secure. Once retrieved (either from cache or from the origin server), GHost puts the fragment back on the DCA queue. Upon receipt of this fragment, the process starts over for the most part. In particular, the response headers are parsed (as there is no need to parse the request headers again because they are the same as on the container page). The appropriate processor type is then instantiated, e.g., based on metadata. For this include, an XSLT processor is created, and this processor is a child of the ESI processor that was created for foo.html.

As noted above, the XML document requires an XSL style sheet. Thus, preferably the XML processor parses the XML file first and creates a DOM tree. It then fires a request for the XSL document (the XSL include will be a child of the XML include). As before, this operation generates a request that is put on the ghost work queue for retrieval. When a response comes back to DCA, the XSL file is parsed and a DOM created for this file. In the final step, both DOM trees (XML and XSL) are sent into the XSLT processing engine. The engine performs the transformation and hands back a result. Once the child has completed processing, it notifies its parent (foo.html) that the processing is complete. Upon receiving notification, the parent takes the resultant data from the fragment (that was generated by the XSLT engine) and inserts it into its respective position in the container page. In this example, the '<esi:include src="bar.xml"/>' is thus replaced with the result of the XSL transformation.

Finally, because there are no more child processor(s) outstanding, the parent processor (in this case, the ESI processor) serializes its output and places the final results (the BufferStack, as processed by DCA) on the GHost work queue. As described above, the GHost worker thread retrieves this object from the queue and returns it to the end user browser, where it is rendered in the usual manner. This completes the processing.

The following describes representative processing of a servlet or jsp object. Familiarity with Java is presumed. The request that requires Java processing is first mapped, e.g., by CP-metadata, to the DCA work queue. As described above, the DCA worker thread takes the request off the DCA queue and instantiates a processor to process the request. The processor is a JavaProcessor object. The JavaProcessor forwards this initial user request to an embedded JVM instance that was invoked as part of system initialization using Java Native Interface (JNI) invocation interfaces. JNI allows Java code that runs within a Java Virtual Machine to operate with applications and libraries written in other languages, such as C, C++, and assembly. Preferably, communications between the JavaProcessor objects and Java objects in the JVM go through an ESI-Java interface that uses the JNI to access Java objects, and to map data types. This native object reference is passed back on all calls through the ESI-Java interface from Java objects to native objects to properly identify the native+ object being called.

Continuing with the example, the request is forwarded to a Java object in the JVM called a Connector, and it includes a pointer to the JavaProcessor native object. The Connector Java object manages a pool of objects called Processors, each of which is associated with a Java Thread object. Each Processor object has a request object, which has an associated InputStream object. Upon instantiation, the InputStream object makes a native call through the ESI-Java interface, passing the native object reference from the JavaProcessor native object associated with the request. The implementation of this native call uses this reference to contact the appropriate JavaProcessor object and obtain the request data in BufferStack form. A JNI method then converts this data to a Java byte array data type, thus copying this data into the InputStream Java object.

As processing continues, additional data may be needed (e.g., from GHost) to complete Java processing of the initial request. This additional data may include Java class files, JSP source files, static HTML files, XML configuration files, or the like. These requests are sent over the ESI-Java interface using a native method call. The implementation of this native method makes a call to the JavaProcessor object for the data. The JavaProcessor object creates a child JavaProcessor object and puts the request for this additional data on the GHost work queue. When GHost puts the requested data back on the DCA queue, a notification is sent to the Java object that requested the data. This Java object is notified through the ESI-Java interface using the JNI to call a notify method on that Java object, and then converting the BufferStack to a Java byte array.

From the above examples, which are merely representative, one of ordinary skill will appreciate that the present invention provides a highly-efficient, yet generalized framework that permits combination of content fragments and containers of a plurality of different types in essentially arbitrary ways. The mechanism enables content providers to carry out dynamic content assembly, content generation and content modification, all from the network edge.

In particular, although most of an example page is generated dynamically, the majority of the fragments making up the page are and/or can be cached and delivered from the edge server. The amount of data that has to be retrieved from the origin server (following assembly and delivery of the page in the first instance) thus is very small. This results in a significant performance improvement for the end user and a reduction of infrastructure (viz., hardware, software, bandwidth, etc.) required to deliver the content provider site. In particular, it is well-known that a typical data center environment for a managed Web site comprises a large number of expensive components including routers, reverse proxy caches, switches, local load balancers, domain name service (DNS) servers, Web servers, application servers, database servers and storage, firewalls, and access lines. Indeed, the typical architecture of a hosted E-business infrastructure is best depicted in tiers. A content generation tier is typically centrally maintained in an enterprise data center or a hosting facility. Its primary function is for application coordination and communication to generate the information that is to be presented to the end-user based on a set of business rules. It typically includes application servers, directory and policy servers, data servers, transaction servers, storage management systems, and other legacy systems. Between the application tier and the content delivery infrastructure is a simple integration layer that provides HTTP-based connectivity between the e-business applications of the content generation tier and the content delivery tier. In the distributed architecture, this tier consists of a single or few Web servers serving as HTTP communication gateways. The content delivery tier includes those machines such as Web servers and routers that are used to deliver the content to the requesting end user. As one of ordinary skill in the art will appreciate, the dynamic content assembly mechanism of the present invention enables a portion of the middle tier and potentially all of the content delivery tier to be moved to the CDN. FIG. 12 illustrates a data center that has been provisioned to use the present invention. As can be seen, the content delivery tier, namely, the routers, reverse proxy caches, switches, local load balancers, domain name service (DNS) servers, Web servers, and the like, are omitted, as they are not necessary for this particular content provider. In addition, much of the dynamic assembly that is done by the application server occurs on the edge servers as well (at least after the page is assembled for the first time). The cost savings to the content provider in terms of facilities, equipment, services, bandwidth, processing, and labor are manifest.

The disclosed technique enhances the reliability, performance and scalability of sites that rely heavily on dynamically generated content and personalization. The performance of Web applications that run in a distributed architecture increases substantially. The content delivery system avoids performance problems introduced by the Internet by locating and caching content near the end-users. Also, moving dynamic content assembly to the plurality of servers (which may number in the thousands) at the edge of the network eliminates the central performance bottleneck of the application server's page assembly engines personalizing content for all users. The edge network significantly reduces the load on the originating site by serving static and dynamic content. Caching frequently requested content at the edge of the network decreases bandwidth requirements at the origin site. In particular, the content provider no longer needs to maintain a possibly over-provisioned site just for peak loads. In addition, the global content delivery network allows the content provider to extend that centralized application infrastructure into new locations by offering a uniform platform for new devices and applications. The CDN enabled with the DCA mechanism provides, in effect, unbounded scalability and reliability.

A CDN that includes the disclosed dynamic content assembly mechanism preferably leverages any convenient server side scripting language or server-based functionality to enable the content provider to cache, distribute and assemble individual content fragments on the edge of the Internet. Web sites with a lot of highly dynamic content that may seem non-cacheable are really simply combinations of cacheable content. By utilizing the DCA mechanism and an appropriate server-based functionality (such as ESI), e-businesses can dynamically assemble personalized and dynamic content on the edge of the Internet just as they do in their own data center.

Even serving truly non-cacheable content through the CDN is generally faster and more reliable than having customers go direct from their browser to the content provider's origin servers. The origin server preferably maintains persistent connections to a finite number of CDN edge servers, rather than trying to do this with huge numbers (perhaps millions) of individual end user browsers. A persistently-maintained connection between the origin server and the CDN speeds up requests, make the origin server generally more reliable and less variable in performance, and it offloads from the origin server a significant amount of CPU processing and memory. Performance improvements result from keeping the connection open between the edge and the origin server with data flowing through it, avoiding the overhead associated with setting up a separate connection for every browser request.

The integration of ESI into content management systems and application servers affords the content provider great flexibility in choosing the best deployment model for an application Web applications that use ESI can be deployed in an intranet environment where the content is being assembled on the local application server or it can be scaled to a global audience on an extranet or the Internet by simply using an Internet CDN. Because both the application server and the CDN server understand the ESI language and content management protocol, applications can be deployed in a flexible and transparent manner, without requiring any changes to the application itself and with the benefits of reduced complexity and infrastructure costs.

Many variants are within the scope of the invention. Thus, for example, the CDN can use data compression to reduce the amount of traffic between the origin server and edge server even more. If the requesting browser supports compression, the CDN edge server will send compressed content to the user. In the event that the browser does not support compression, the edge server will decompress the content and send it to the browser uncompressed. CDN edge servers can also forward or process most commonly used technologies employed for personalization, such as User-agents, cookies and geographic location.

Although the invention has been described as leveraging what has been described as ESI, this is not a requirement. Any convenient server side scripting language or other server-based functionality may be used to fire include(s) identified in a given container or content fragment, to evaluate conditional expressions, to perform variable substitutions, and the like. Generalizing, the mechanism of the present invention may be used with any generalized server-based functionality including, without limitation, ESI, SSI, XSSI, JSP, ASP, PHP, Zope, ASP.NET, Perl, and many others. In addition, while the output content types illustrated above are HTML and XML, this is not a limitation of the invention either. Other convenient output formats include, without limitation, text (other than HTML and XML), .pdf, other binaries, .gif files, .jpg files, and the like. Generalizing, any content that includes server-based embedded scripting functionality (e.g., ESI tags) can be processed by the inventive mechanism. ESI is desirable as it is a scripting language that can be embedded in any content irrespective of mime-type, but the invention is not limited to use with ESI. Further, as noted above, the inventive framework may be used to provide dynamic content generation and/or modification, not just content assembly. This includes conversion of one file format to another (e.g., HTML to WAP, .gif to .jpg), compression, decompression, translation, transcoding, and the like.

Having thus described our invention, what we now claim is set forth below.

The invention claimed is:

1. Apparatus for assembling content fragments into a container, wherein the container comprises markup identifying one or more content fragments, comprising:
a hardware processor;
computer memory that includes a first queue, and a second queue;
the computer memory holding computer program instructions that when executed by the hardware processor perform the following method:
receiving, by a host process, a request for the container, and placing the request in the second queue;
removing from the second queue, by a first execution thread, the request, and processing the request to generate a data object;
instantiating a software processor;
generating, by the software processor, a parse tree representation of the container, the parse tree representation including an edge side include (ESI) code directive associated with at least one content fragment in the container;
cloning the parse tree representation in a cache;
processing, by the software processor, and from top to bottom of the parse tree representation, each ESI code directive, wherein, if an ESI code directive in the parse tree representation is an ESI include, placing a request associated with the ESI include in the first queue for handling by a second execution thread;
as ESI code directives are processed, having the software processor concatenate results into the data object;
after the parse tree representation is parsed from top to bottom, placing the data object on the first queue;
retrieving, by the second execution thread, the data object, and building a response to the request for the container; and
serving the response.

2. The apparatus as described in claim 1 wherein the software processor is one of: an HTML processor, an XSLT processor, a Java processor and a PHP processor.

3. The apparatus as described in claim 1 wherein two or more software processors are instantiated by the first execution thread.

4. The apparatus as described in claim 3 wherein a first software processor is a text processor that processes the container and a second software processor is an XSLT processor that processes an XML content fragment.

5. The apparatus as described in claim 1 wherein the processing of the parse tree representation is carried out by a first software processor and a second software processor, wherein the first software processor is instantiated as a parent processor and, thereafter, the second software processor is instantiated as a child processor.

6. The apparatus as described in claim 1 wherein the parse tree representation is formatted as a document object model (DOM).

7. The apparatus as described in claim 1 wherein the ESI code directive is a conditional include.

8. The apparatus as described in claim 1 wherein the ESI code directive performs variable substitution.

9. The apparatus as described in claim 1 wherein the ESI code directive evaluates an expression.

10. The apparatus as described in claim 1 wherein the method further includes extinguishing the software processor after the response is served.

* * * * *